United States Patent
Liu et al.

[11] Patent Number: 6,071,211
[45] Date of Patent: Jun. 6, 2000

[54] IDLE DRIVE TORQUE CONTROL FOR AUTOMATED VEHICLE MASTER CLUTCH

[75] Inventors: Chia-Hsiang Liu, Northville; Timothy J. Morscheck, Kalamazoo, both of Mich.

[73] Assignee: Eaton Corporation, Cleveland, Ohio

[21] Appl. No.: 09/195,093

[22] Filed: Nov. 18, 1998

[51] Int. Cl.$^7$ .................................................. B60K 41/02
[52] U.S. Cl. ........................................ 477/175; 477/180
[58] Field of Search .................................... 477/174, 175, 477/166, 180, 173; 74/335, 336 R

[56] References Cited

U.S. PATENT DOCUMENTS

| | | | |
|---|---|---|---|
| 4,081,065 | 3/1978 | Smyth et al. | 192/0.076 |
| 4,289,222 | 9/1981 | Esthimer | 477/74 |
| 4,361,060 | 11/1982 | Smyth | 74/866 |
| 4,576,265 | 3/1986 | Kumura et al. | 477/175 |
| 4,595,986 | 6/1986 | Daubenspeck | 364/424.1 |
| 4,632,231 | 12/1986 | Hattori et al. | 477/39 |
| 4,646,891 | 3/1987 | Braun | 192/0.032 |
| 4,700,823 | 10/1987 | Winckler | 192/107 |
| 4,730,712 | 3/1988 | Ohkumo | 477/73 |
| 4,838,397 | 6/1989 | Kurihara et al. | 477/175 |
| 4,860,861 | 8/1989 | Gooch et al. | 192/3.26 |
| 4,986,396 | 1/1991 | Morimoto | 477/175 |
| 5,024,305 | 6/1991 | Kurihara et al. | 477/95 |
| 5,097,724 | 3/1992 | Braun | 477/73 |
| 5,275,267 | 1/1994 | Slicker | 192/0.033 |
| 5,293,316 | 3/1994 | Slicker | 364/424.1 |
| 5,314,050 | 5/1994 | Slicker et al. | 477/171 |
| 5,337,868 | 8/1994 | Liu et al. | 477/74 |
| 5,337,874 | 8/1994 | Oltean et al. | 192/111 |
| 5,383,823 | 1/1995 | Ward et al. | 447/86 |
| 5,393,274 | 2/1995 | Smedley | 477/74 |
| 5,404,301 | 4/1995 | Slicker | 364/424.1 |
| 5,411,124 | 5/1995 | Olson | 192/103 |
| 5,441,137 | 8/1995 | Organek et al. | 192/35 |
| 5,441,462 | 8/1995 | Chan | 477/175 |
| 5,485,904 | 1/1996 | Organek et al. | 192/35 |
| 5,509,867 | 4/1996 | Genise | 477/120 |
| 5,624,350 | 4/1997 | Bates | 477/78 |
| 5,630,773 | 5/1997 | Slicker et al. | 477/176 |
| 5,738,609 | 4/1998 | Jones et al. | 477/175 |
| 5,803,869 | 9/1998 | Jamzadeh et al. | 477/174 X |

*Primary Examiner*—Charles A. Marmor
*Assistant Examiner*—Ha Ho
*Attorney, Agent, or Firm*—Howard D. Gordon

[57] ABSTRACT

A control for a vehicle drive line system (10) including an automated vehicle master clutch (14) drivingly interposed in between a fuel-controlled engine (12) and the input shaft (20) of a mechanical transmission. At sensed idle conditions (THL<REF and OS<REF), the engine (12) is commanded to generate an output torque ($T_{FW}$) equal to a selected idle drive torque ($T_{IDLE}$) at idle speed (ES=IDLE), the engine is commanded to rotate at idle speed and the clutch, preferably a wet clutch, is caused to engage with a torque capacity equal to the idle drive torque.

26 Claims, 5 Drawing Sheets

2

IDLE DRIVE TORQUE CONTROL FOR AUTOMATED VEHICLE MASTER CLUTCH

RELATED APPLICATIONS

This application is related to the following applications, all assigned to EATON CORPORATION, assignee of this application, and all filed the same date, Nov. 18, 1998, as this application:

Ser. No. 09/189,995 [98-rTRN-398] entitled TOUCH POINT IDENTIFICATION FOR VEHICLE MASTER CLUTCH Ser. No. 09/197,544 [98-rTRN-399] entitled VEHICLE LAUNCH AUTOMATED MASTER CLUTCH CONTROL

BACKGROUND OF THE INVENTION

1. Field of the Invention

The present invention relates to controls for vehicular master clutches, preferably wet friction clutches, utilized in partially or fully automated mechanical transmission systems. In particular, the present invention relates to a control for a vehicle master clutch, preferably a wet clutch, wherein at idle conditions, the master clutch is engaged to a relatively low idle drive torque torque transfer capacity.

2. Description of the Prior Art

Partially and fully automated vehicular mechanical transmission systems utilizing friction master clutches are known in the prior art, as may be seen by reference to U.S. Pat. Nos. 4,361,060; 4,595,986; 4,850,236; 4,648,290; 5,389,053; 5,487,004; 5,487,005 and 5,509,867, the disclosures of which are incorporated herein by reference.

Controls for automated friction master clutches, usually dry friction clutches, utilized in vehicular automated transmission systems are known, as may be seen by reference to U.S. Pat. Nos. 4,081,065; 4,646,891; 4,860,861; 5,275,267; 5,293,316; 5,314,050; 5,337,868; 5,337,874; 5,383,823; 5,393,274; 5,411,124; 5,404,301; 5,630,773; 5,624,350 and 5,738,609, the disclosures of which are incorporated herein by reference.

SUMMARY OF THE INVENTION

According to the present invention, a control for an automated master friction clutch, such as a wet friction clutch, is provided which utilizes the information available on industry standard electronic vehicular data links, such as data links conforming to the SAE J1922, SAE J1939 and/or ISO 11898 protocols, to provide improved clutch control and clutch functional features as compared to the prior art.

By sensing and controlling engine flywheel torque utilizing an electronically controlled engine connected to an industry standard data link (see U.S. Pat. No. 5,509,867, the disclosure of which is incorporated herein by reference), and controlling the engaged condition of a master friction clutch, a master clutch drive train system providing an "urge to move" at idle conditions is provided.

Accordingly, it is an object of the present invention to provide an improved control for a vehicle drive line including a master friction clutch which will provide an "urge-to-move" torque at idle conditions.

This and other objects and advantages of the present invention will become apparent from a reading of the following description of the preferred embodiment taken in connection with the attached drawings.

DESCRIPTION OF THE PREFERRED EMBODIMENT

Figure 1:
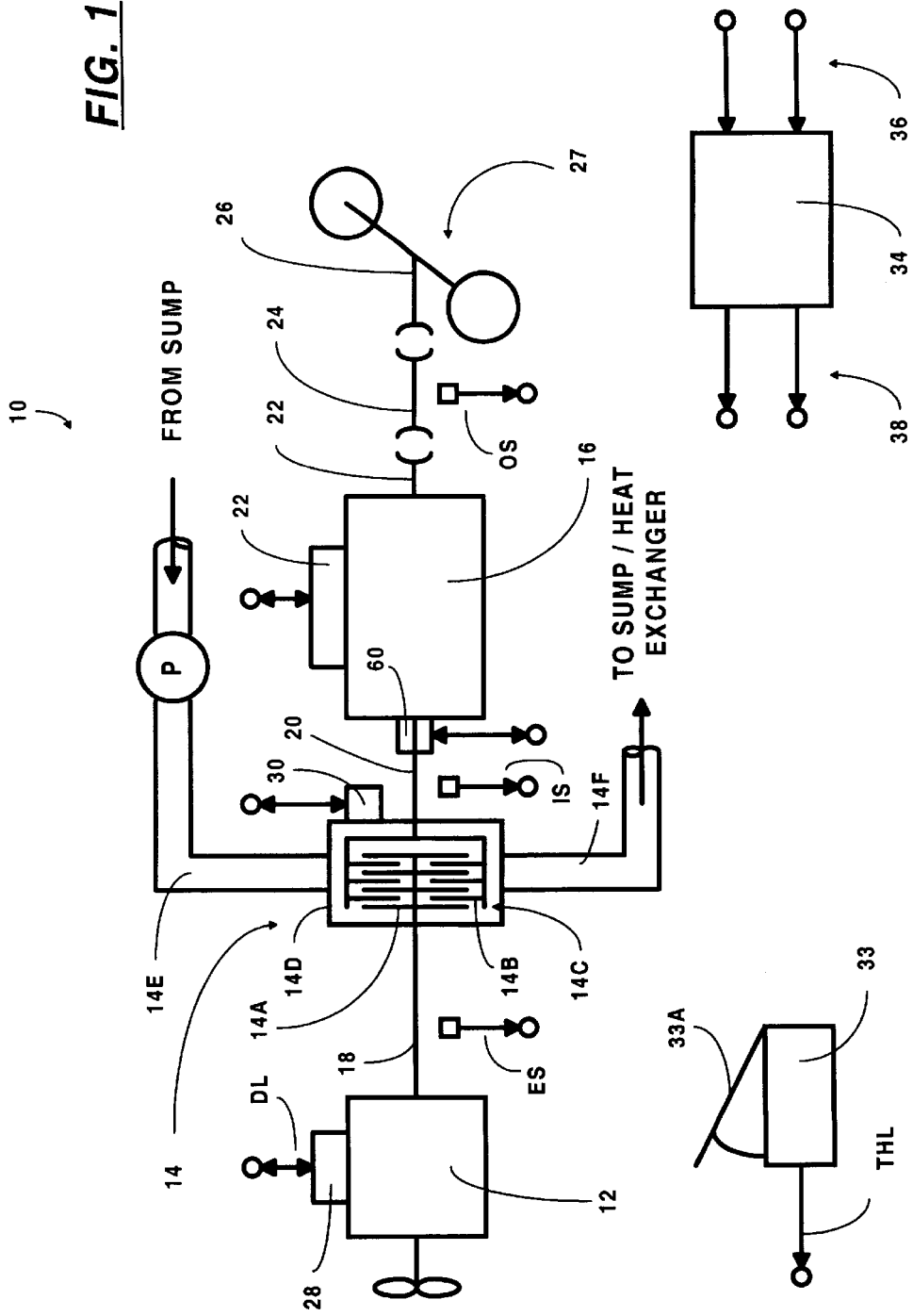
FIG. 1 is a schematic illustration of a vehicular automated mechanical transmission system advantageously utilizing the idle drive torque master clutch control of present invention.

A vehicular automated mechanical transmission system 10 advantageously utilizing the idle drive torque master clutch control of the present invention is schematically illustrated in FIG. 1.

System 10 includes a fuel-controlled engine 12, a wet master friction clutch 14 and a multiple-speed mechanical transmission 16. Engine 12 is typically a diesel or gasoline engine and has an output member or crank shaft 18 which drives friction discs 14A of clutch 14, which are interdigitated with friction discs 14B, rotationally fixed to input shaft 20 of transmission 16.

Transmission 16 may be of the simple or compound type, as illustrated in U.S. Pat. No. 5,370,561, the disclosure of which is incorporated herein by reference. Transmission 16 has an output shaft 22, which drives a drive shaft 24 connected to the input 26 of a vehicle drive axle mechanism 27.

An engine controller 28, which is preferably electronically and microprocessor-controlled, is provided for controlling fueling of the engine and for providing output information to an electronic data link DL, preferably conforming to the industry standard SAE J1939 or a comparable protocol. System 10 also includes a clutch actuator 30 for controlling operation of clutch 14 and a transmission actuator 32 for controlling operation of transmission 16. A sensor 33 is provided for sensing throttle 33A position and providing a signal THL indicative thereof. Throttle position information also may be obtained from the data link.

Electronic engines controlled by an SAE J1939 or similar data link typically have four modes of operation, (i) fuel according to throttle position, (ii) fuel according to requested engine speed, (iii) fuel according to requested gross engine torque, and (iv) fuel not to exceed a requested maximum engine speed and gross engine torque.

A microprocessor-based control unit 34 is provided for receiving input signals 36 and processing same according to control logic to generate command output signals 38 to the system actuators. The ECU may be separate or integral with the engine controller. The various controllers, sensors and/or actuators may communicate over a data link conforming to an industry standard protocol, such as SAE J1939 or the like.

Suitable sensors, such as sensors for sensing engine speed ES, input shaft speed IS and/or output shaft speed OS, and actuators are known to those of ordinary skill in the art and examples thereof, not intended to be limiting, may be seen by reference to U.S. Pat. Nos. 4,361,060; 4,873,881; 4,974,468; 5,135,218; 5,279,172; 5,305,240; 5,323,669; 5,408,898; 5,441,137; 5,445,126; 5,448,483 and 5,481,170.

Clutch 14 is defined as a "wet clutch," as the friction members thereof, 14A and 14B, are exposed to liquid, such as a synthetic such as Dextron III or the like, for heat transfer and/or lubrication purposes. In the illustrated embodiment, the clutch pack 14C is contained within a housing 14D, which is connected to source conduit 14E and an exhaust conduit 14F. While a forced coolant system is illustrated, the present invention also is applicable to wet clutches wherein the friction members are in a relatively static sump or the like. While the illustrated preferred embodiment utilizes a multidisc wet clutch 14, the present invention also is applicable to single-disc wet clutches and/or dry clutches.

As is known (see aforementioned U.S. Pat. No. 5,509,867), a data link conforming to the SAE J1939 protocol or a comparable protocol, transmits information by which engine output torque (also called "flywheel torque") may be read or determined. These data links also allow a command to the engine to adjust fueling such that a particular engine speed and/or a particular engine torque is achieved. By utilizing this information and engine control capability, the master clutch 14 may be controlled to provide enhanced system performance.

Figure 2:
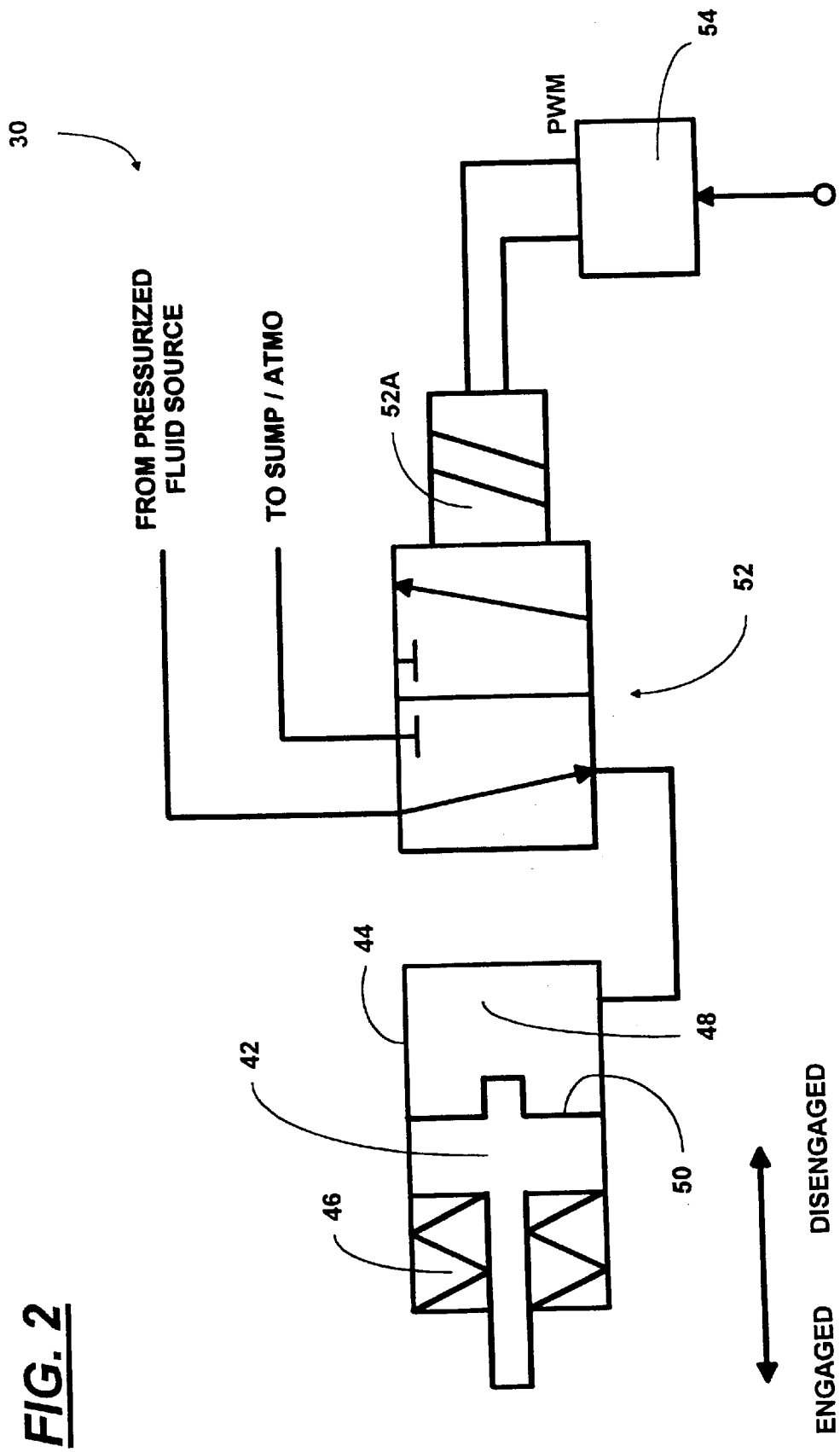
FIG. 2 is a schematic illustration of a pressurized fluid-actuated control mechanism for controlling the engaged condition of a vehicular master clutch.

A fluid pressure-operated clutch actuator assembly 30 is schematically illustrated in FIG. 2. A clutch operator piston 42 is received in a cylinder 44 and is biased in the disengaging direction by springs 46. Pressurized fluid, such as a hydraulic fluid or pressurized air, introduced into chamber 48 will act on piston face 50 to move the piston 42 in the engaged direction against the bias of the springs. A two-position, three-way, solenoid-controlled valve 52 is provided to selectively pressurize and exhaust chamber 48. A valve controller 54 responding to control signals from system controller 34 controls energizing of the solenoid 52A of valve 52, preferably by pulse width modulation (PWM).

Although a pressurized fluid-type actuator assembly 30 is illustrated, the present invention also is applicable to clutch controls using other types of clutch actuators, such as ball ramp actuators or the like (see U.S. Pat. Nos. 5,441,137 and 5,485,903, the disclosures of which are incorporated herein by reference).

The friction material of clutch discs 14A and 14B may be of standard material or may be of pyrolytic carbon, as disclosed in U.S. Pat. No. 4,700,823 or the like.

Figure 3:
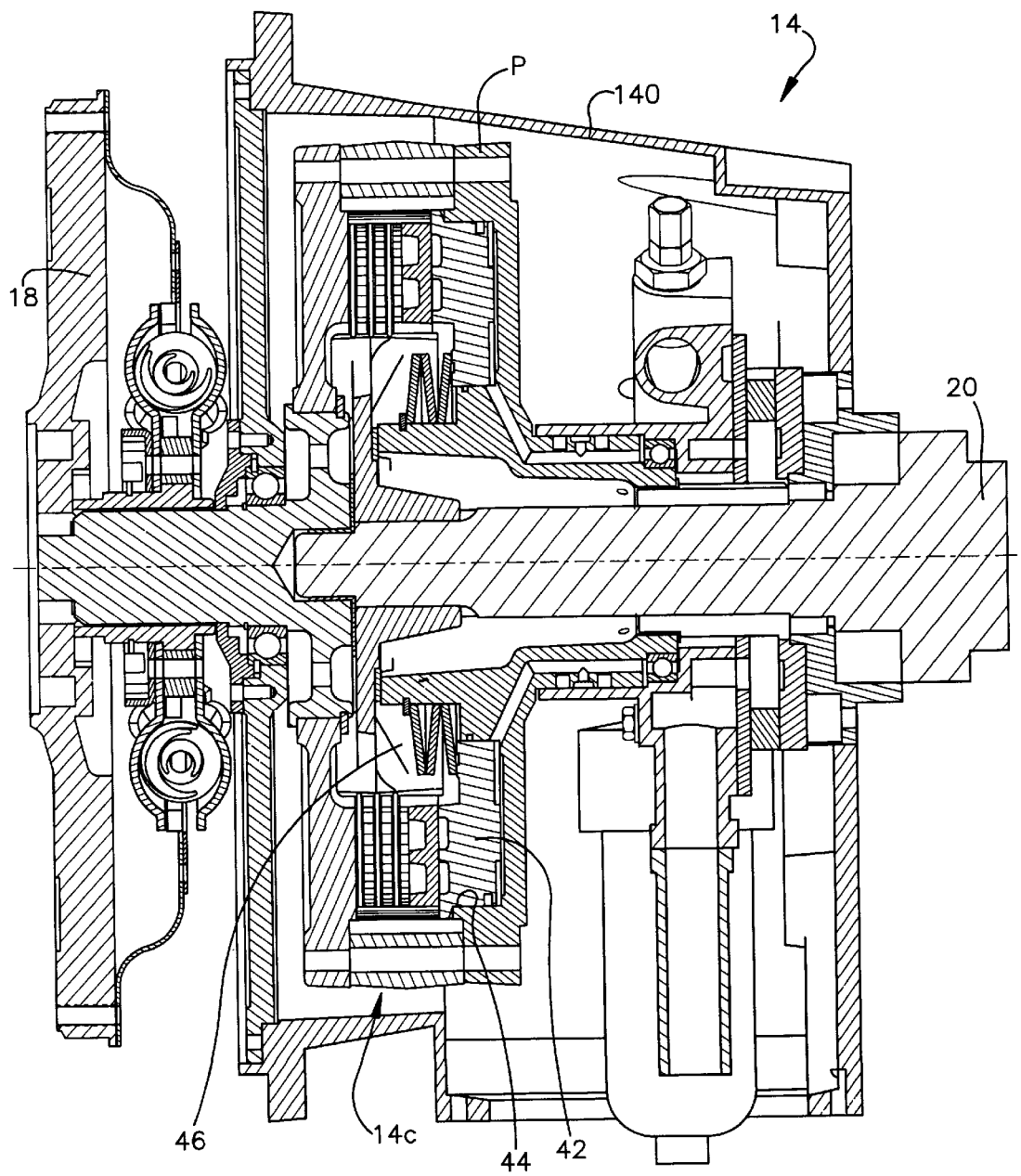
FIG. 3 is a partial sectional view of a vehicular wet master friction clutch of the type utilized in the system of FIG. 1.

The structure of a typical wet master friction clutch 14 may be seen by reference to FIG. 3. Briefly, the engine output 18, shown as a dampened flywheel, is connected to the transmission input shaft 20 by the engageable and disengageable friction disc pack 14C. The clutch is contained within a housing 14D, which will hold the lubricating and cooling fluid, such as a synthetic Dextron III or the like. Annular piston 42 is slidably and sealingly contained in a cylinder 44 and is biased in the disengaged direction by springs 46.

System 10 also may include an inertia brake, also known as an input shaft brake or upshift brake 60, for decelerating or stopping the input shaft 20 for more rapid upshifting. Inertia brakes are known, as may be seen by reference to U.S. Pat. Nos. 5,086,659 and 5,713,445.

Applicants have discovered that, at engine idle speed (about 850 to 900 RPM) with the transmission engaged in a low ratio, such as first gear, it is desirable that the engine generate at the flywheel, and the master clutch be slightly engaged to transfer, a small amount of torque sufficient to cause slow or creeping movement of the vehicle if the vehicle brakes are not applied. This will provide a mode of operation similar to that expierienced by drivers of passenger automobiles equipped with torque converter-type transmissions.

The advantages of such a provision for an "urge-to-move" feature in a drive line and automatic friction master clutch control is that the vehicle will feel and act like a familiar passenger car equipped with an automatic transmission, the vehicle may be maneuvered at slow speeds using the brake pedal only, and vehicle launches will be quicker with less lurch as the system backlashes have been taken up.

The amount of flywheel or output torque generated by the engine at idle speed, and transferable by the clutch in the "urge-to-move" engagement condition (i.e., the idle drive torque) should be sufficient to allow creeping if the brakes are not applied but small enough to allow the clutch to dissipate the heat energy developed when the clutch is slipped due to application of the vehicle brakes.

By way of example, for a medium-duty vehicle (MVMA Class 6 having a GVW of 19,501 to 25,000 pounds), a flywheel torque of about 20 to 30 pound-feet will provide about 3 horsepower, which is sufficient to move the vehicle and which generates an amount of heat at full slipping (900 RPM) that can be substantially continuously dissipated by a wet clutch. Of course, the amount of "urge-to-move" torque transferable by the clutch must also be selected so that only acceptable wear is caused during slipping when the vehicle is maintained in a stopped condition by application of the brakes.

For purposes of explaining an example of the preferred embodiment fo the present invention, it is assumed that the system includes an SAE J1939-type data link, that engine speed (ES) and gross engine torque ($T_{EG}$) may be read and/or commanded on the data link and that engine flywheel torque ($T_{FW}$) is equal to gross engine torque ($T_{EG}$) minus certain friction and accessory torques ($T_P$). Using this relationship, ($T_{FW}=T_{EG}-T_P$), with a known or calculated value for parasitic torque ($T_P$), the value of gross engine torque to be requested for a desired output or flywheel torque is known.

Figure 4:
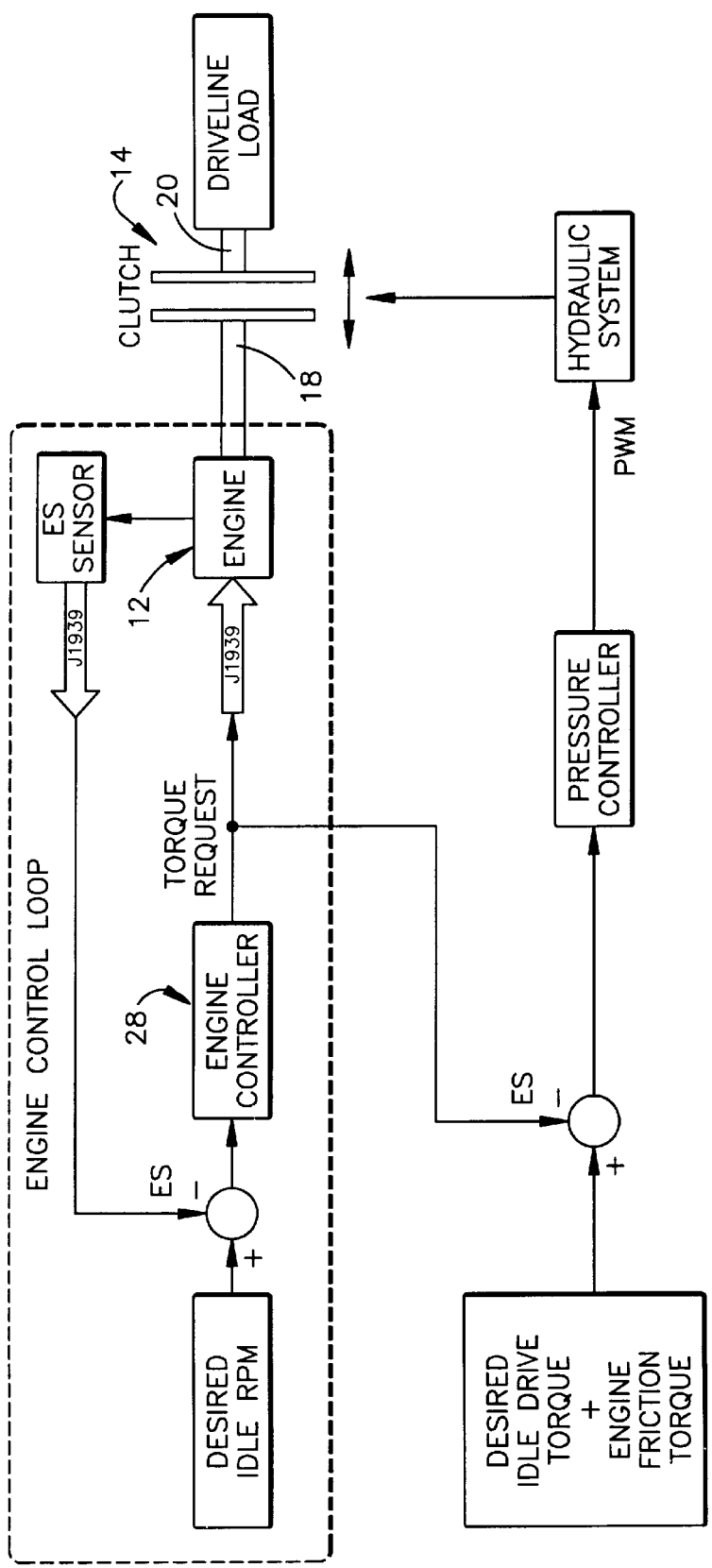
FIG. 4 is a schematic illustration of the idle drive torque master clutch control system of the present invention, which includes both hardware and software (shown in shadowed blocks).
Figure 5:
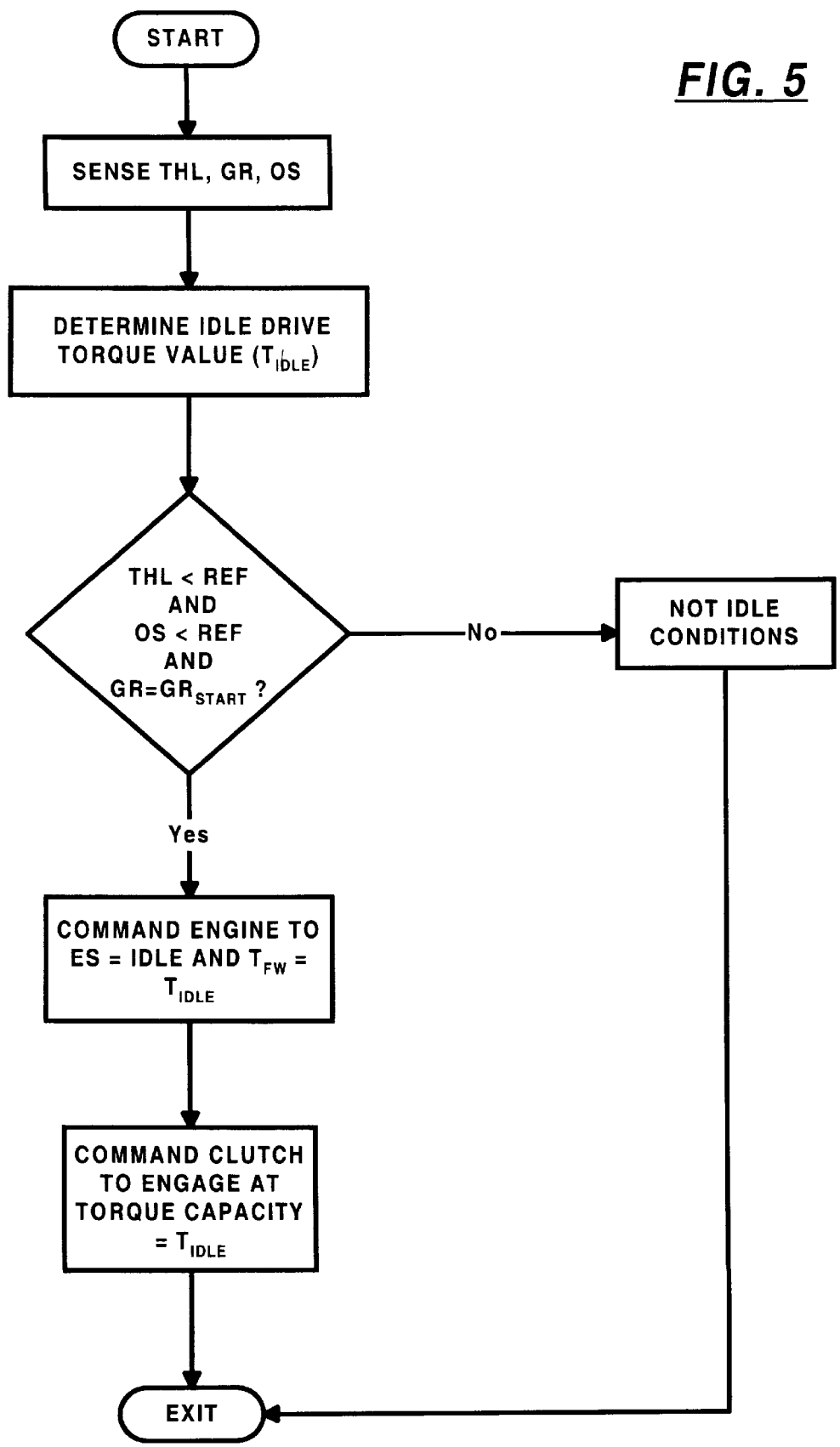
FIG. 5 is a schematic illustration, in flow chart format, of the idle drive torque master clutch control logic of the present invention.

FIG. 4 depicts the entire idle drive torque control system which comprises both hardware and software (shadowed blocks). The function of the engine control loop is to maintain (or control) the engine speed to a desired speed. To engage the clutch, the pressure controller will send a PWM command to the solenoid-actuated hydraulic system, which in turn pressurizes the clutch piston 42 to engage the clutch 14. The engaged clutch torque (especially at relatively low values, such as 0 to 50 pound-feet) is substantially directly proportional to the PWM command.

To engage the clutch to the idle drive torque level, the engine controller will first maintain the engine speed at a desired idle RPM by sending the appropriate engine torque request to the engine via the SAE J1939 communication link DL. When the engine control loop achieves its balance, the amount of torque request will be equal to that of engine friction torque (at desired idle RPM), plus the clutch torque (zero if not engaged). The system will then try to engage the clutch gradually to the level of desired idle drive torque (26 pound-feet). To do this, the system uses the value of torque request as the feedback reference. As the clutch is being engaged gradually, the load to the engine increases and, hence, slows down the engine speed. In response to the speed change, the engine controller will increase the torque request to the engine to maintain the engine speed at the desired idle RPM. When the torque request reaches the value of 26 pound-feet above engine parasitic torque ($T_{EG}=T_P+26$) and engine speed stabilizes at idle speed, the engaged clutch torque will then be equal to 26 pound-feet. The system will try to maintain the clutch engagement at this level from this point on. If for some reason the value of torque request changes (due to temperature changes or otherwise), the system will adjust the engine torque (PWM) command accordingly to maintain the torque request value at 26 pound-feet above engine parasitic torque and, hence, maintain the flywheel torque constant at 26 pound-feet.

Using commands and feedback over the SAE J1939 data link DL, with the clutch 14 disengaged (therefore, load is zero), the system will cause engine speed to stabilize at idle speed (about 850 to 900 RPM). The sensed gross engine torque at this point is equal to the parasitic torque ($T_P$). The clutch is then gradually engaged, and the engine again stabilized at idle speed until the gross engine torque equals parasitic torque plus the selected idle drive torque ($T_{EG}=T_P+T_{ID}$), at which point flywheel torque ($T_{FW}$) and the torque capacity of the clutch 14 will both equal the desired idle torque drive.

When at a vehicle-stopped or low-speed condition (OS<REF) with the operator throttle position equaling zero, the engine will be commanded to the idle speed with a gross engine torque equaling the idle drive torque, plus the parasitic torque ($T_P+T_{ID}$), and the clutch will be commanded into the idle drive torque capacity condition. The "urge-to-move" feature also may require that the transmission be engaged in low gear, an acceptable start gear, or in reverse gear. Acceptable start gears will vary with the number of forward transmission ratios, as is known.

Accordingly, it may be seen that a new and improved drive line and master clutch control providing an idle drive torque is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling a vehicular drive line system including a fuel-controlled engine having an output member, a multiple-speed change-gear transmission having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said engine controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said method characterized by:

(1) selecting an idle drive torque value;

(2) comparing throttle device displacement to a first reference value and vehicle speed to a second reference value; and (3) if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.

2. The method of claim 1 wherein said driveline system is on a vehicle having vehicle brakes and said idle drive torque value is selected to be sufficient to move the vehicle on level ground if the vehicle brakes are not applied, but not sufficient to move the vehicle on level ground if the vehicle brakes are applied.

3. The method of claim 1 wherein said transmission has a rated input torque and said idle drive torque value is less than ten percent (10%) of the rated input torque of the transmission.

4. The method of claim 1 wherein said transmission has a rated input torque value in the range of 400 to 600 pound-feet and said idle drive torque is in the range of 20 to 40 pound-feet.

5. The method of claim 1 wherein step (3) additionally requires that said transmission be engaged in a starting gear.

6. The method of claim 1 wherein said transmission is a mechanical transmission utilizing positive jaw clutches.

7. The method of claim 1 wherein said clutch is a liquid-cooled wet clutch.

8. The method of claim 2 wherein said clutch is a liquid cooled wet clutch.

9. The method of claim 5 wherein said clutch is a liquid cooled wet clutch.

10. The method of claim 1 wherein step (3) additionally requires that said transmission be engaged in one of a low speed ratio and a reverse ratio.

11. The method of claim 1 wherein said system controller is microprocessor-based and said engine controller communicates with an electronic data link.

12. The method of claim 1 wherein said first reference value equals about zero throttle displacement.

13. The method of claim 1 wherein said second reference value equals about 3 MPH.

14. The method of claim 1 wherein said selected speed is the preselected idle speed of said engine.

15. The method of claim 1 wherein said engine controller will commanded to cause said engine to generate a gross engine torque ($T_{EG}$), torque at the engine output ($T_{FW}$) is equal said to gross engine torque minus parasitic engine torque ($T_{FW}=T_{EG}-T_P$), and said parasitic engine torque at a given engine speed is determined by a lookup table which uses the information of engine friction torque (via SAE J1939) as an input to the table.

16. A vehicular drive line system including a fuel-controlled engine having an output member, a multiple-speed, change-gear transmission having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said system characterized by said logic rules including rules for:

(1) storing a preselected an idle drive torque value;

(2) comparing throttle device displacement to a first reference value and vehicle speed to a second reference value; and (3) if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.

17. The system of claim 16 wherein said driveline system is on a vehicle having vehicle brakes and said idle drive torque value is selected to be sufficient to move the vehicle on level ground if the vehicle brakes are not applied, but not sufficient to move the vehicle on level ground if the vehicle brakes are applied.

18. The system of claim 16 wherein said transmission has a rated input torque and said idle drive torque value is less than ten percent (10%) of the rated input torque of the transmission.

19. The system of claim 16 wherein said transmission has a rated input torque value in the range of 400 to 600 pound-feet and said idle drive torque is in the range of 20 to 40 pound-feet.

20. The system of claim 17 wherein the logic rule (3) additionally requires that said transmission be engaged in a starting gear.

21. The system of claim 16 wherein said transmission is a mechanical transmission utilizing positive jaw clutches.

22. The system of claim 16 wherein said clutch is a liquid-cooled wet clutch.

23. The system of claim 16 wherein said system controller is microprocessor-based and said engine controller communicates with an electronic data link.

24. The system of claim 16 wherein said first reference value equals about zero throttle displacement.

25. The system of claim 16 wherein said second reference value equals about 3 MPH.

26. The system of claim 16 wherein said selected speed is the preselected idle speed of said engine.

\* \* \* \* \*

(12) EX PARTE REEXAMINATION CERTIFICATE (5350th)
United States Patent
Liu et al.

(10) Number: US 6,071,211 C1
(45) Certificate Issued: Apr. 18, 2006

(54) IDLE DRIVE TORQUE CONTROL FOR AUTOMATED VEHICLE MASTER CLUTCH

(75) Inventors: Chia-Hsiang Liu, Northville, MI (US); Timothy J. Morscheck, Kalamazoo, MI (US)

(73) Assignee: Eaton Corporation, Cleveland, OH (US)

Reexamination Request:
No. 90/006,142, Nov. 21, 2001

Reexamination Certificate for:
Patent No.: 6,071,211
Issued: Jun. 6, 2000
Appl. No.: 09/195,093
Filed: Nov. 18, 1998

(51) Int. Cl.
B60K 41/02 (2006.01)

(52) U.S. Cl. .................................. 477/175; 477/180
(58) Field of Classification Search ................ 477/166, 477/173–175, 180; 74/335, 336 R
See application file for complete search history.

(56) References Cited

U.S. PATENT DOCUMENTS

| 4,081,065 | A | 3/1978 | Smyth et al. |
|---|---|---|---|
| 4,289,222 | A | 9/1981 | Esthimer |
| 4,361,060 | A | 11/1982 | Smyth |
| 4,576,265 | A | 3/1986 | Kumura et al. |
| 4,595,986 | A | 6/1986 | Daubenspeck et al. |
| 4,632,231 | A | 12/1986 | Hattori et al. |
| 4,646,891 | A | 3/1987 | Braun |
| 4,700,823 | A | 10/1987 | Winckler |
| 4,730,712 | A | 3/1988 | Ohkumo |
| 4,838,397 | A | 6/1989 | Kurihara |
| 4,860,861 | A | 8/1989 | Gooch |
| 4,986,396 | A | 1/1991 | Morimoto |
| 5,024,305 | A | 6/1991 | Kurihara |
| 5,097,724 | A | 3/1992 | Braun |
| 5,275,267 | A | 1/1994 | Slicker |
| 5,293,316 | A | 3/1994 | Slicker |
| 5,314,050 | A | 5/1994 | Slicker et al. |
| 5,337,868 | A | 8/1994 | Liu et al. |
| 5,337,874 | A | 8/1994 | Oltean et al. |
| 5,383,823 | A | 1/1995 | Ward et al. |
| 5,393,274 | A | 2/1995 | Smedley |
| 5,404,301 | A | 4/1995 | Slicker |
| 5,411,124 | A | 5/1995 | Olson |
| 5,441,137 | A | 8/1995 | Organek et al. |
| 5,441,462 | A | 8/1995 | Chan |
| 5,485,904 | A | 1/1996 | Organek et al. |
| 5,509,867 | A | 4/1996 | Genise |
| 5,624,350 | A | 4/1997 | Bates |
| 5,630,773 | A | 5/1997 | Slicker et al. |
| 5,738,609 | A | 4/1998 | Jones et al. |
| 5,803,869 | A | 9/1998 | Jamzadeh et al. |
| 5,916,061 | A | * 6/1999 | Koyama et al. ............ 477/175 |
| 6,113,515 | A | * 9/2000 | Salecker et al. ............ 477/72 |

OTHER PUBLICATIONS

"More on SAE Standards" web page, www.sae.org/products/standards/stdsinfo/stds2, copyright 2003 to SAE International.*

* cited by examiner

Primary Examiner—Dirk Wright

(57) ABSTRACT

A control for a vehicle drive line system (10) including an automated vehicle master clutch (14) drivingly interposed in between a fuel-controlled engine (12) and the input shaft (20) of a mechanical transmission. At sensed idle conditions (THL<REF and OS<REF), the engine (12) is commanded to generate an output torque ($T_{FW}$) equal to a selected idle drive torque ($T_{IDLE}$) at idle speed (ES=IDLE), the engine is commanded to rotate at idle speed and the clutch, preferably a wet clutch, is caused to engage with a torque capacity equal to the idle drive torque.

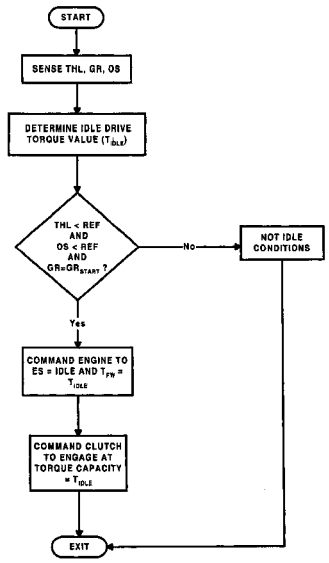

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5–7, 9–12, 14–16, 21–24 and 26 are cancelled.

Claims 2–4, 13, 17–19 and 25 are determined to be patentable as amended.

Claims 8 and 20, dependent on an amended claim, are determined to be patentable.

New claims 27–42 are added and determined to be patentable.

2. [The method of claim 1 wherein] *A method for controlling a vehicular drive line system including a fuel-controlled engine having an output member, a multiple-speed change-gear transmission having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said engine controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, and said driveline system is on a vehicle having vehicle brakes* [and said idle drive torque value is selected to be], *said method characterized by:*
- (1) selecting an idle drive torque value *sufficient to move the vehicle on level ground if the vehicle brakes are not applied, but not sufficient to move the vehicle on level ground if the vehicle brakes are applied;*
- (2) *comparing throttle device displacement to a first reference value and vehicle speed to a second reference value; and*
- (3) *if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.*

3. [The method of claim 1 wherein said transmission has] *A method for controlling a vehicular drive line system including a fuel-controlled engine having an output member, a multiple-speed change-gear transmission having* a rated input torque [and said idle drive torque value is] *and having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said engine controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said method characterized by:*
- (1) selecting an idle drive torque value less than ten percent (10%) of the rated input torque of the transmission;
- (2) *comparing throttle device displacement to a first reference value and vehicle speed to a second reference value; and*
- (3) *if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.*

4. [The method of claim 1 wherein said transmission has] *A method for controlling a vehicular drive line system including a fuel-controlled engine having an output member, a multiple-speed change-gear transmission having* a rated input torque value in the range of 400 to 600 pound-feet [and said idle drive torque is] *and having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said engine controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said method characterized by:*
- (1) selecting an idle drive torque value in the range of 20 to 40 pound-feet;
- (2) *comparing throttle device displacement to a first reference value and vehicle speed to a second reference value; and*
- (3) *if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.*

13. [The method of claim 1 wherein] *A method for controlling a vehicular drive line system including a fuel-controlled engine having an output member, a multiple-speed change-gear transmission having an input shaft drivingly coupled to said output member by a master friction* clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said engine controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said method characterized by:

(1) selecting and idle drive torque value;

(2) comparing throttle device displacement to a first reference value and vehicle speed to a second reference value and said second reference value equals about 3 MPH; and (3) if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.

17. [The system of claim 16 wherein] *A vehicular drive line system including a fuel-controlled engine having an output member, a multiple-speed, change-gear transmission having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, and* said driveline system is on a vehicle having vehicle brakes [and said idle drive torque value is selected to be], *said system characterized by said logic rules including rules for:*

(1) *storing a preselected idle drive torque value* sufficient to move the vehicle on level ground if the vehicle brakes are not applied, but not sufficient to move the vehicle on level ground if the vehicle brakes are applied;

(2) *comparing throttle device displacement to a first reference value and vehicle speed to a second reference value; and*

(3) *if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.*

18. [The system of claim 16 wherein said transmission has] *A vehicular drive line system including a fuel-controlled engine having an output member, a multiple-speed, change-gear transmission having* a rated input torque value in the range of 400 to 600 pound-feet [and said idle drive torque value is] *and having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said system characterized by said logic rules including rules for:*

(1) *storing a preselected idle drive torque value* less than ten percent (10%) of the rated input torque of the transmission;

(2) *comparing throttle device displacement to a first reference value and vehicle speed to a second reference value; and*

(3) *if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.*

19. [The system of claim 16 wherein said transmission has] *A vehicular drive line system including a fuel-controlled engine having an output member, a multiple-speed, change-gear transmission having* a rated input torque value in the range of 400 to 600 pound-feet [and said idle drive torque is] *and having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said system characterized by said logic rules including rules for:*

(1) *storing a preselected idle drive torque value* in the range of 20 to 40 pound-feet;

(2) *comparing throttle device displacement to a first reference value and vehicle speed to a second reference value; and*

(3) *if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.*

25. [The system of claim 16 wherein] *A vehicular drive line system including a fuel-controlled engine having an output member, a multiple-speed, change-gear transmission* having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said system characterized by said logic rules including rules for:

(1) storing a preselected idle drive torque value;

(2) comparing throttle device displacement to a first reference value and vehicle speed to a second reference value *and* said second reference value equals about 3 MPH; and (3) if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.

*27. A method for controlling a vehicular drive line system on a vehicle having vehicle brakes which have a brake applied and a brake not applied condition, said drive line system including a fuel-controlled engine having an output member, a multiple-speed change-gear transmission having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said engine controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said method characterized by:*

*(1) selecting an idle drive torque value;*

*(2) comparing throttle device displacement to a first reference value and vehicle speed to a second reference value; and*

*(3) for both the brake applied and brake not applied condition of said vehicle brakes, if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.*

*28. The method of claim 27 wherein said idle drive torque value is selected to be sufficient to move the vehicle on level ground if the vehicle brakes are not applied, but not sufficient to move the vehicle on level ground if the vehicle brakes are applied whereby said vehicle may be maneuvered at slow speeds using only the vehicle brakes.*

*29. The method of claim 28 wherein said transmission has a rated input torque in the range of 400 to 600 pound-feet and said idle drive torque is in the range of 20 to 40 pound-feet.*

*30. The method of claim 28 wherein step (3) additionally requires that said transmission be engaged in a starting gear.*

*31. The method of claim 28 wherein said clutch is a liquid-cooled wet clutch.*

*32. A vehicular drive line system for a vehicle having vehicle brakes which have a brake applied and a brake not applied condition, said drive line system including a fuel-controlled engine having an output member, a multiple-speed change-gear transmission having an input shaft drivingly coupled to said output member by a master friction clutch, a clutch operator for selectively engaging and disengaging said clutch to provide a selected torque transfer capacity from said output member to said input shaft, an operator-set throttle device for manual requesting of fuel supply to said engine, an engine controller for controlling fueling of said engine, said controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said system characterized by said logic rules including rules for:*

*(1) storing a preselected idle drive torque value;*

*(2) comparing throttle device displacement to a first reference value and vehicle speed to a second reference value; and*

*(3) for both the brake applied and brake not applied condition of said vehicle brakes, if throttle device displacement is no greater than said first reference value and vehicle speed is less than said second reference value, (i) causing said engine to rotate at a selected speed and to develop said idle drive torque at the output member thereof and (ii) causing said clutch to be engaged to have a torque transfer capacity equal to said idle drive torque.*

*33. The system of claim 32 wherein said idle drive torque value is selected to be sufficient to move the vehicle on level ground if the vehicle brakes are not applied, but not sufficient to move the vehicle on level ground if the vehicle brakes are applied whereby said vehicle may be maneuvered at slow speeds using only the vehicle brakes.*

*34. The system of claim 33 wherein said transmission has a rated input torque in the range of 400 to 600 pound-feet and said idle drive torque is in the range of 20 to 40 pound-feet.*

*35. The system of claim 33 wherein the logic rule (3) additionally requires that said transmission be engaged in a starting gear.*

*36. The system of claim 33 wherein said clutch is a liquid-cooled wet clutch.*

*37. A method for controlling a vehicular drive line system on a vehicle having vehicle brakes which have a brake applied and a brake not applied condition, said drive line system including a fuel-controlled engine having an output member, a multiple-speed change-gear transmission having an input shaft drivingly coupled to said output member by a master friction clutch, a clutch operator for selectively engaging and disengaging said clutch to provide a selected torque transfer capacity from said output member to said input shaft, an operator-set throttle device for manual*

*requesting of fuel supply to said engine, an engine controller for controlling fueling of said engine, said engine controller effective to fuel said engine to cause said engine to rotate at a selected engine speed and to develop a selected torque, a system controller for receiving input signals including signals indicative of (i) displacement of said throttle device and (ii) speed of said vehicle, and for processing same according to logic rules to issue command output signals to system actuators including said clutch operator and said engine controller, said method characterized by:*

(*1*) *selecting an idle drive torque value (Tidle);*

(*2*) *selecting a desired engine idle speed (ESidle);*

(*3*) *comparing throttle device displacement to a first reference value and vehicle speed to a second reference value; and*

(*4*) *for both the brake applied and brake not applied condition of said vehicle brakes if throttle device displacement is no greater than said first reference value and vehicle speed is less than said second reference value,*

(*i*) *causing said engine to have an output torque equal to said idle drive torque value and said clutch to be engaged to have an initial torque transfer capacity equal to said idle drive torque value,*

(*ii*) *comparing sensed engine speed to said idle speed;*

(*iii*) *if sensed engine speed is greater than said idle speed, then causing at least one of (a) engine output torque to be decreased and (b) said clutch to be increasingly engaged to have an increased torque capacity,*

(*iv*) *if sensed engine speed is less than said idle speed, then causing at least one of (a) engine output torque to be increased and (b) said clutch to be decreasingly engaged to have a decreased torque capacity, and*

(*v*) *if sensed engine speed is equal to said idle speed, then causing engine output torque and clutch torque capacity to remain substantially constant with steps (i) through (v) thereby (a) causing said engine to rotate at a selected speed and to attain said idle drive torque value at the output member thereof and (b) causing said clutch to be engaged to maintain a torque transfer capacity substantially equal to said idle drive torque value.*

38. *The method of claim 37 wherein said idle drive torque value is selected to be sufficient to move the vehicle on level ground if the vehicle brakes are not applied, but not sufficient to move the vehicle on level ground if the vehicle brakes are applied whereby said vehicle may be maneuvered at slow speeds using only the vehicle brakes.*

39. *The method of claim 37 wherein step (4) additionally requires that said transmission be engaged in a starting gear.*

40. *The method of claim 37 wherein said clutch is a liquid-cooled wet clutch.*

41. *The method of claim 38 wherein said clutch is a liquid-cooled wet clutch.*

42. *The method of claim 39 wherein said clutch is a liquid-cooled wet clutch.*

\* \* \* \* \*